(12) United States Patent
Onishi et al.

(10) Patent No.: US 7,011,199 B2
(45) Date of Patent: Mar. 14, 2006

(54) TANDEM FRICTIONAL ENGAGEMENT DEVICE AND AUTOMATIC TRANSMISSION MOUNTED THEREWITH

(75) Inventors: Hirofumi Onishi, Aichi-gun (JP); Yuji Yasuda, Nishikamo-gun (JP); Toshiki Kanada, Anjou (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 45 days.

(21) Appl. No.: 10/797,082

(22) Filed: Mar. 11, 2004

(65) Prior Publication Data

US 2004/0238314 A1 Dec. 2, 2004

(30) Foreign Application Priority Data

Mar. 12, 2003 (JP) ............................. 2003-067234

(51) Int. Cl.
*F16D 25/063* (2006.01)
*F16H 61/04* (2006.01)

(52) U.S. Cl. .................. 192/87.15; 192/70.2; 475/146

(58) Field of Classification Search ............ 192/87.11, 192/87.14, 87.15, 113.34, 70.12, 70.2, 18 A; 475/146, 280, 316, 322, 328
See application file for complete search history.

(56) References Cited

U.S. PATENT DOCUMENTS

| 3,977,272 | A | * | 8/1976 | Neumann | 475/281 |
|---|---|---|---|---|---|
| 4,640,294 | A | * | 2/1987 | Ordo | 192/70.2 |
| 6,213,272 | B1 | * | 4/2001 | Braford, Jr. | 192/87.11 |
| 6,305,517 | B1 | * | 10/2001 | Cole | 192/87.15 |
| 6,374,687 | B1 | * | 4/2002 | Tanizawa et al. | 192/87.11 |

FOREIGN PATENT DOCUMENTS

| JP | 8-61393 | | 3/1996 |
|---|---|---|---|
| WO | WO 2003/106868 A1 | * | 12/2003 |

\* cited by examiner

*Primary Examiner*—Rodney H. Bonck
(74) *Attorney, Agent, or Firm*—Oblon, Spivak, McClelland, Maier & Neustadt, P.C.

(57) ABSTRACT

A friction disc in a tandem frictional engagement device, that is spline-fitted to a first coupling members is pressed by a first piston in a first direction, wherein the friction disc and another friction disc on the side of a first coupled member are clamped between the first piston and a first stopper member. A friction disc that is spline-fitted to a second coupling member is pressed by a second piston in an opposite direction, wherein the friction disc and another friction disc on the side of a second coupled member are clamped between the second piston and a second stopper member. A leading end of a first fitting portion of the first coupling member to which the friction disc is spline-fitted is the second stopper member and substantially abuts a second fitting portion of the second coupling member to which the friction disc is spline-fitted.

9 Claims, 5 Drawing Sheets

|     | C1 | C2 | B1 | B2 | B3 | F |
|-----|----|----|----|----|----|---|
| 1st |    | O  |    | ◎  |    | O |
| 2nd |    | O  | O  |    |    |   |
| 3rd |    | O  |    |    | O  |   |
| 4th | O  | O  |    |    |    |   |
| 5th | O  |    |    |    | O  |   |
| 6th | O  |    | O  |    |    |   |
| Rev |    |    |    | O  | O  |   |

TANDEM FRICTIONAL ENGAGEMENT DEVICE AND AUTOMATIC TRANSMISSION MOUNTED THEREWITH

INCORPORATION BY REFERENCE

The disclosure of Japanese Patent Application No. 2003-067234 filed on Mar. 12, 2003 including the specification, drawings and abstract is incorporated herein by reference in its entirety.

BACKGROUND OF THE INVENTION

1. Field of the Invention

The invention relates to an improvement in a tandem frictional engagement device in which frictional engagement units such as clutches, brakes and the like are axially disposed adjacent to one another, and to an automatic transmission mounted with the tandem frictional engagement device.

2. Description of the Related Art

A great number of vehicular automatic transmissions employing a plurality of planetary gear units and frictional engagement units such as clutches, brakes, and the like have been in use. There is known a tandem frictional engagement device comprising (a) a first frictional engagement unit and (b) a second frictional engagement unit. The first frictional engagement unit couples a first coupling member to a first coupled member through a procedure wherein a friction disc that is relatively non-rotatably spline-fitted to the first coupling member is pressed by a first piston in a first direction and wherein the friction disc and another friction disc on the side of the first coupled member are clamped between the first piston and a first stopper member. The second frictional engagement unit is substantially equal in radial dimension to the first frictional engagement unit, is disposed on the side of the first direction while being coaxial with and adjacent to the first frictional engagement unit, and couples a second coupling member to a second coupled member through a procedure wherein a friction disc that is relatively non-rotatably spline-fitted to the second coupling member is pressed by a second piston in a direction opposite to the first direction and wherein the friction disc and another friction disc on the side of the second coupled member are clamped between the second piston and a second stopper member. One such example is an automatic transmission disclosed in Japanese Patent Application Laid-Open No. 8-61393. In this automatic transmission, first and second coupling members are constructed as a common coupling member, and first and second stopper members are constructed as a common snap ring.

Figure 6A:
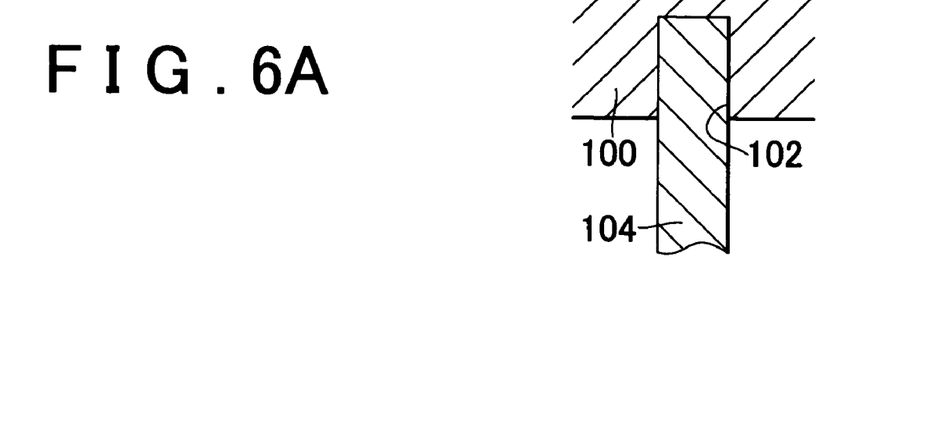
FIGS. 6A, 6b, 6c are cross-sectional views illustrating some examples of the related art in which a snap ring is used as a stopper member of a tandem frictional engagement device.
Figure 6B:
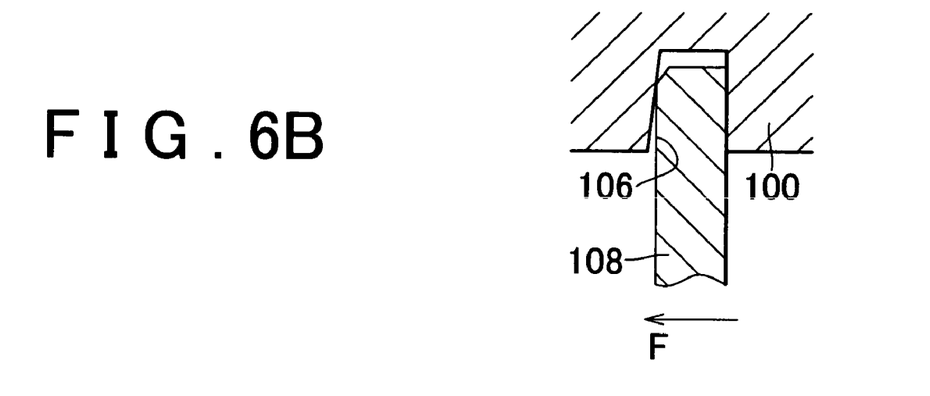

However, if a snap ring 104 is fitted in a straight groove 102 formed in a common coupling member 100, for example, as shown in FIG. 6A, a predetermined gap (looseness) is inevitably created between the straight groove 102 and the snap ring 104. Therefore, it is difficult to manage a piston stroke of adjacent ones of frictional engagement units, and to finely control an engagement torque during a gear shift with high precision. If a snap ring 108 is fitted in a tapered groove 106 having one slanting wall surface as shown in FIG. 6B, there is no gap between the tapered groove 106 and the snap ring 108. However, if a load F is applied leftwards during engagement of a frictional engagement unit on the right side, the snap ring 108 becomes likely to tumble down. This not only makes it difficult to manage a piston stroke of the frictional engagement unit on the right side. Namely, when a frictional engagement unit on the opposite or left side is released, the clearance between friction discs thereof decreases and causes an increase in dragging torque. As a result, a deterioration in transmission efficiency may be caused, or the friction discs may be worn.

Figure 6C:
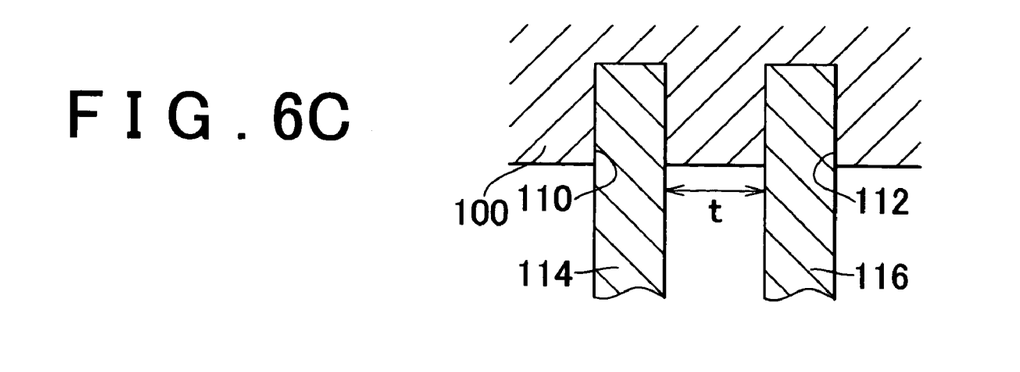

Further, if straight grooves 110 and 112 are provided for frictional engagement units on both sides respectively while snap rings 114 and 116 are fitted in the straight grooves 110 and 112 respectively as shown in FIG. 6C, problems such as creation of the aforementioned gap or tumbling are solved. However, a dimension "t" needs to be set between the straight grooves 110 and 112 so as to ensure a predetermined strength. As a result, the overall axial dimension is increased, and the mountability for a vehicle is adversely affected. In such cases where the snap rings are provided separately for the frictional engagement units, even if rattling is caused due to a gap, engagement is always carried out with a constant piston stroke. Thus, it is not absolutely required that the grooves be tapered.

On the other hand, the tandem frictional engagement device of the related art requires that the friction discs of the pair of the frictional engagement units and the like be sequentially mounted to the common coupling member. For example, therefore, in the case where a tandem brake is mounted to a case or the like, the mounting operation is sometimes troublesome and time-consuming.

SUMMARY OF THE INVENTION

The invention has been made in view of the aforementioned background. As one mode of implementing the invention, a tandem frictional engagement device comprising (a) a first frictional engagement unit and (b) a second frictional engagement unit is provided. The first frictional engagement unit couples a first coupling member to a first coupled member through a procedure wherein a friction disc that is relatively non-rotatably spline-fitted to the first coupling member is pressed by a first piston in a first direction and wherein the friction disc and another friction disc on the side of the first coupled member are clamped between the first piston and a first stopper member. The second frictional engagement unit couples a second coupling member to a second coupled member through a procedure wherein a friction disc that is relatively non-rotatably spline-fitted to the second coupling member is pressed by a second piston in a direction opposite to the first direction and wherein the friction disc and another friction disc on the side of the second coupled member are clamped between the second piston and a second stopper member. In this tandem frictional engagement device, (c) the first coupling member and the second coupling member are constructed separately from each other, and (d) a leading end of a first fitting portion of the first coupling member to which the friction disc is spline-fitted is so disposed as to substantially abut on a second fitting portion of the second coupling member to which the friction disc is spline-fitted, while the leading end of the first coupling member is used as the second stopper member. Further, an automatic transmission that is mounted with the aforementioned tandem frictional engagement device is provided as well.

In the tandem frictional engagement device as mentioned above, the leading end of the first fitting portion of the first frictional engagement unit substantially abuts on the second fitting portion of the second frictional engagement unit, and functions as the second stopper member. Therefore, there is no need to provide the second stopper member as a separate piece, and the overall axial dimension can be reduced in comparison with a case where a pair of snap rings are fitted as the first and second stopper members. Besides, since it is improbable that the first fitting portion will be deformed during engagement of the second frictional engagement unit, it is easy to manage a piston stroke of the second frictional engagement unit, and the control of engagement torque can be performed finely with high precision. Since the friction disc of the first frictional engagement unit is not influenced at all, a suitable clearance is maintained, so that the occurrence of dragging is inhibited.

The first frictional engagement unit can be constructed as a single frictional engagement unit substantially in the same manner as in the related art, without taking the second frictional engagement unit into account. For instance, a snap ring as the first stopper member may be fitted in an annular mounting groove (a straight groove or a tapered groove). Thus, the control of engagement torque can be performed finely with high precision by scrolling the pistons, and the clearance between the friction discs of the second frictional engagement unit is not influenced during engagement of the first frictional engagement unit.

Further, the first and second coupling members are constructed separately from each other. For example, therefore, friction discs can be spline-fitted to the first and second coupling members respectively, and the first and second frictional engagement units can be assembled with each other after being mounted to each other and disposed adjacent to each other. As a result, the degree of freedom in mounting operation is enhanced, and the manufacturing cost can be reduced.

BRIEF DESCRIPTION OF THE DRAWINGS

The above-mentioned and other objects, features, advantages, technical and industrial significances of this invention will be better understood by reading the following detailed description of a preferred embodiment of the invention, when considered in connection with the accompanying drawings.

DETAILED DESCRIPTION OF THE PREFERRED EMBODIMENT

In the following description and the accompanying drawings, the invention will be described in more detail with reference to an exemplary embodiment.

Figure 1A:
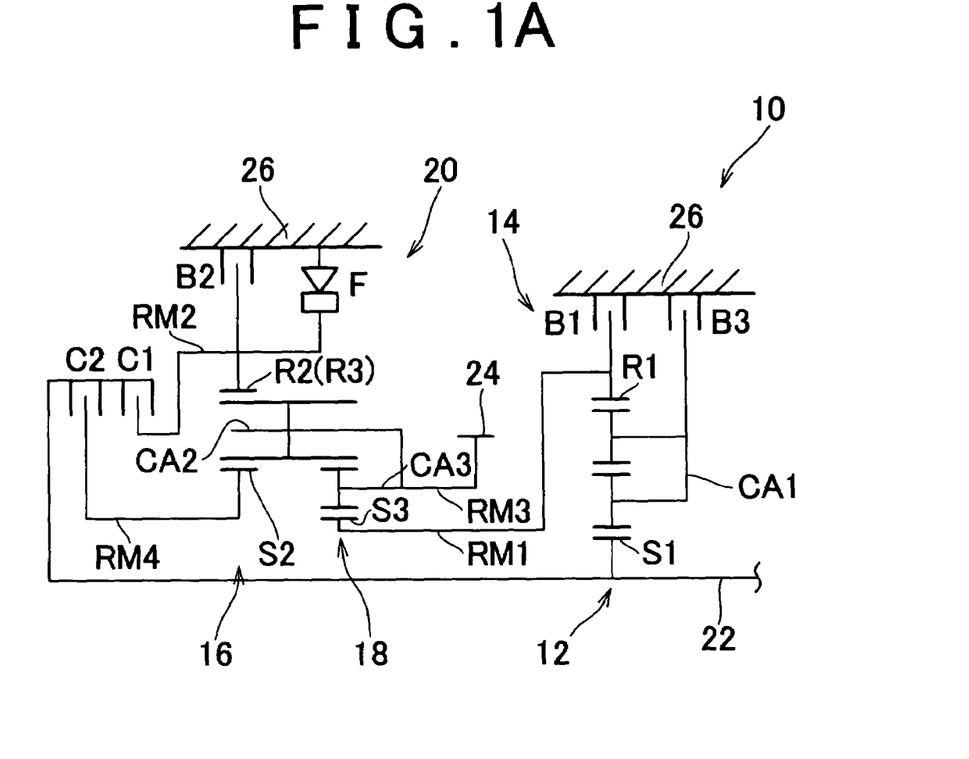
FIG. 1A is an illustrative view of a vehicular automatic transmission equipped with a tandem frictional engagement device in accordance with an embodiment as an example of the invention.
Figure 1B:
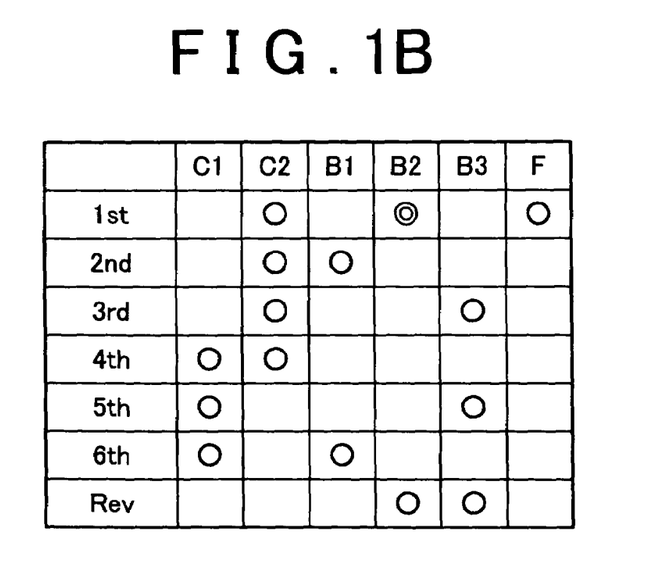
FIG. 1B shows operational states of clutches and brakes when respective gear-shift stages of the vehicular automatic transmission are established.

FIG. 1A is a skeleton diagram of a vehicular automatic transmission 10 to which the invention is applied. FIG. 1B is an operational chart explaining states of engagement elements when a plurality of gear-shift stages are established. The vehicular automatic transmission 10 is designed to be placed transversely in a front-engine front-drive vehicle. In the vehicular automatic transmission 10, a first gear-shift portion 14 and a second gear-shift portion 20 are coaxially disposed. The first gear-shift portion 14 is mainly composed of a first planetary gear unit 12 of double pinion type, while the second gear-shift portion 20 is mainly composed of a second planetary gear unit 16 of single pinion type and a third planetary gear unit 18 of double pinion type. The vehicular automatic transmission 10 changes a speed of rotation of an input shaft 22 and outputs the rotation from an output gear 24. The input shaft 22 corresponds to the input member and may be a turbine shaft or the like of a torque converter that is rotationally driven by a traction drive source such as an engine or the like. The output gear 24 corresponds to an output member and rotationally drives right and left driving wheels via a differential gear unit. It is to be noted herein that the vehicular automatic transmission 10 is constructed substantially symmetrically with respect to a center line and that a lower-half portion of the vehicular automatic transmission 10 below the center line is omitted in FIG. 1A.

The first planetary gear unit 12 constituting the first gear-shift portion 14 has three rotational elements, namely, a sun gear S1, a carrier CA1, and a ring gear R1. The sun gear S1 is coupled to the input shaft 22 and rotationally driven, and the carrier CA1 is non-rotatably fixed to a case 26 via a brake B3. Thus, the ring gear R1 as an intermediate output member is caused to rotate in a decelerative manner with respect to the input shaft 22 and outputs rotation thereof. The second planetary gear unit 16 and the third planetary gear unit 18 constituting the second gear-shift portion 20 are partially coupled to each other, whereby four rotational elements RM1 to RM4 are constituted. More specifically, the sun gear S3 of the third planetary gear unit 18 constitutes the first rotational element RM1. The ring gear R2 of the second planetary gear unit 16 also serves as the ring gear R3 of the third planetary gear unit 18 and constitutes the second rotational element RM2. A carrier CA2 of the second planetary gear 16 and a carrier CA3 of the third planetary gear unit 18 are coupled to each other and constitute the third rotational element RM3. The sun gear S2 of the second planetary gear unit 16 constitutes the fourth rotational element RM4. The second planetary gear unit 16 and the third planetary gear unit 18 are designed as a planetary gear train of Ravigneaux type wherein the carriers CA2 and CA3 are constructed of a common member, wherein the ring gear R2 also serves as the ring gear R3 and is constructed of a member common thereto, and wherein a pinion gear of the second planetary gear unit 16 also serves as a second pinion gear of the third planetary gear unit 18.

The first rotational element RM1 (the sun gear S3) is selectively coupled by the first brake B1 to the case 26 and is stopped from rotating. The second rotational element RM2 (the ring gears R2 and R3) is selectively coupled to the input shaft 22 via a first clutch C1, is selectively coupled by the second brake B2 to the case 26, and is stopped from rotating. The fourth rotational element RM4 (the sun gear S2) is selectively coupled to the input shaft 22 via a second clutch C2. The first rotational element RM1 (the sun gear S3) is integrally coupled to the ring gear R1 of the first planetary gear unit 12 as an intermediate output member. The third rotational element RM3 (the carriers CA2 and CA3) is integrally coupled to the output gear 24 and outputs rotation. Each of the first brake B1, the second brake B2, the third brake B3, the first clutch C1, and the second clutch C2 is a hydraulically-operated multiple-disc frictional engagement unit that is frictionally engaged by a hydraulic cylinder. A one-way clutch F, which prevents the second rotational element RM2 from rotating reversely while allowing it to rotate positively (i.e., in the same rotational direction as the input shaft 22), is disposed between the second rotational element RM2 and the case 26 and in parallel with the second brake B2.

Figure 2:
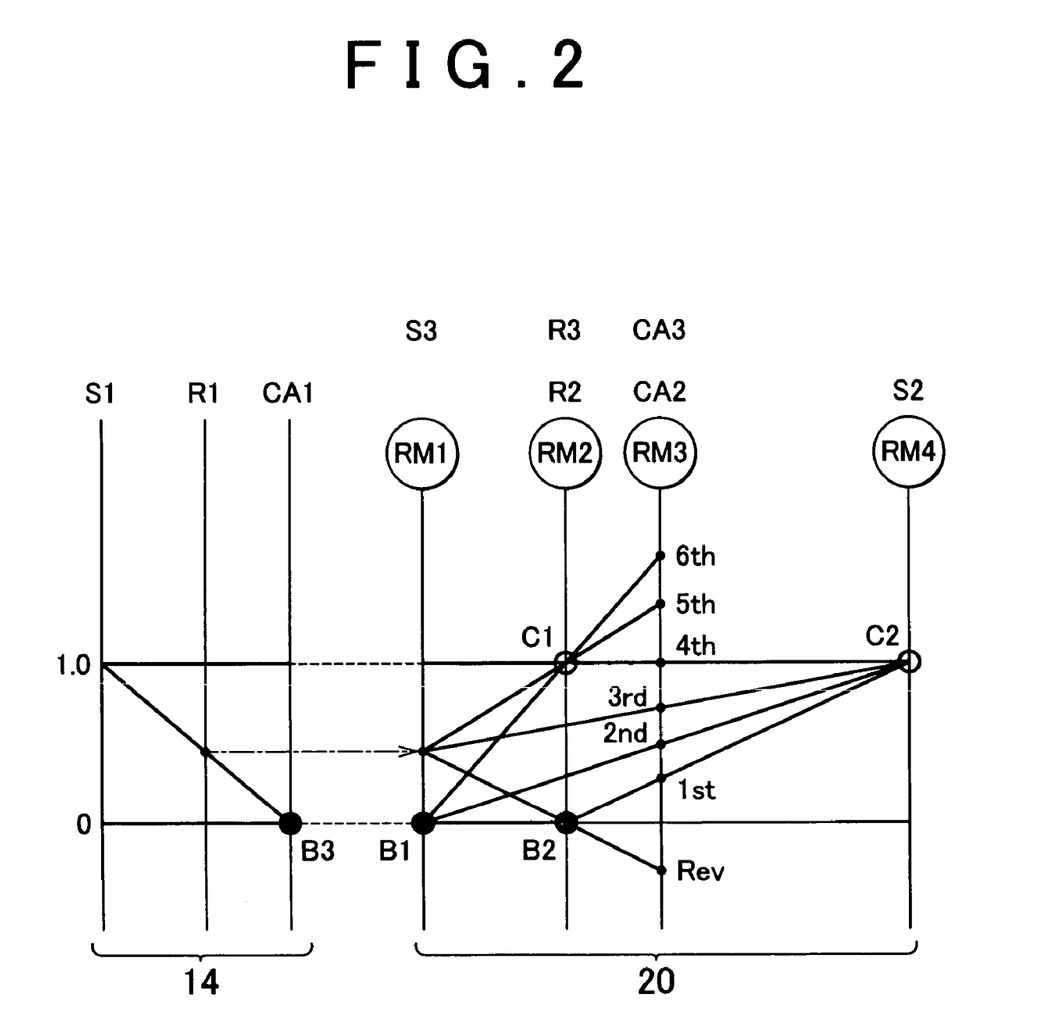
FIG. 2 is an alignment chart of the embodiment shown in FIG. 1.

FIG. 2 is a nomogram capable of expressing rotational speeds of the respective rotational elements of the first gear-shift portion 14 and the second gear-shift portion 20 as straight lines. A lower horizontal line represents a rotational speed of "0", whereas an upper horizontal line represents a rotational speed of "1.0", namely, the same rotational speed as the input shaft 22. A left vertical line, a center vertical line, and a right vertical line of the first gear-shift portion 14 represent the sun gear S1, the ring gear R1, and the carrier CA1 respectively. Distances among the vertical lines are determined in accordance with a gear ratio ρ1 of the first planetary gear unit 12 (i.e., the number of teeth of the sun gear/the number of teeth of the ring gear). A first-left vertical line, a second-left vertical line, a second-right vertical line, and a first-right vertical line of the second gear-shift portion 20 represent the first rotational element RM1 (the sun gear S3), the second rotational element RM2 (the ring gears R2 and R3), the third rotational element RM3 (the carriers CA2 and CA3), and the fourth rotational element RM4 (the sun gear S2) respectively. Distances among the vertical lines are determined in accordance with a gear ratio ρ2 of the second planetary gear unit 16 and a gear ratio ρ3 of the third planetary gear unit 18. It is to be noted herein that gear ratio ρ=a number of teeth of the sun gear/a number of teeth of the ring gear.

As is apparent from the aforementioned alignment chart, if the second clutch C2 and the second brake B2 are engaged so that the fourth rotational element RM4 is caused to rotate together with the input shaft 22 and that the second rotational element RM2 is stopped from rotating, the third rotational element RM3 coupled to the output gear 24 is caused to rotate at a rotational speed indicated by "1st", and a first gear-shift stage "1st" having the largest gear-shift ratio is established. If the second clutch C2 and the first brake B1 are engaged so that the fourth rotational element RM4 is caused to rotate together with the input shaft 22 and that the first rotational element RM1 is stopped from rotating, the third rotational element RM3 is caused to rotate at a rotational speed indicated by "2nd", and a second gear-shift stage "2nd" that is smaller in gear-shift ratio than the first gear-shift stage "1st" is established. If the second clutch C2 and the third brake B3 are engaged so that the fourth rotational element RM4 is caused to rotate together with the input shaft 22 and that the first rotational element RM1 is caused to rotate in a decelerative manner via the first gear-shift portion 14, the third rotational element RM3 is caused to rotate at a rotational speed indicated by "3rd", and a third gear-shift stage "3rd" that is smaller in gear-shift ratio than the second gear-shift stage "2nd" is established. If the first clutch C1 and the second clutch C2 are engaged so that the second gear-shift portion 20 is caused to rotate together with the input shaft 22, the third rotational element RM3 is caused to rotate at a rotational speed indicated by "4th", namely, at the same rotational speed as the input shaft 22, and a fourth gear-shift stage "4th" that is smaller in gear-shift ratio than the third gear-shift stage is established. The gear-shift ratio of the fourth gear-shift stage "4th" is 1. If the first clutch C1 and the third brake B3 are engaged so that the second rotational element RM2 is caused to rotate together with the input shaft 22 and that the first rotational element RM1 is caused to rotate in a decelerative manner via the first gear-shift portion 14, the third rotational element RM3 is caused to rotate at a rotational speed indicated by "5th", and a fifth gear-shift stage "5th" that is smaller in gear-shift ratio than the fourth gear-shift stage "4th" is established. If the first clutch C1 and the first brake B1 are engaged so that the second rotational element RM2 is caused to rotate together with the input shaft 22 and that the first rotational element RM1 is stopped from rotating, the third rotational element RM3 is caused to rotate at a rotational speed indicated by "6th", and a sixth gear-shift stage "6th" that is smaller in gear-shift ratio than the fifth gear-shift stage "5th" is established. If the second brake B2 and the third brake B3 are engaged so that the second rotational element RM2 is stopped from rotating and that first rotational element RM1 is caused to rotate in a decelerative manner via the first gear-shift portion 14, the third rotational element RM3 is caused to rotate reversely at a rotational speed indicated by "Rev", and a backward gear-shift stage "Rev" is established.

The operational chart shown in FIG. 1B comprehensively shows a relationship between the aforementioned respective gear-shift stages and operational states of the clutches C1 and C2 and the brakes B1 to B3. Each circle represents engagement, and a double circle represents engagement that is carried out only at the time of engine braking. Because the one-way clutch F is disposed in parallel with the brake B2 for establishing the first gear-shift stage "1st", it is not absolutely required that the brake B2 be engaged during takeoff (during acceleration). Gear-shift ratios of the respective gear-shift stages are suitably determined in accordance with the gear ratio ρ1 of the first planetary gear unit 12, the gear ratio ρ2 of the second planetary gear unit 16, and the gear ratio ρ3 of the third planetary gear unit 18.

Figure 3:
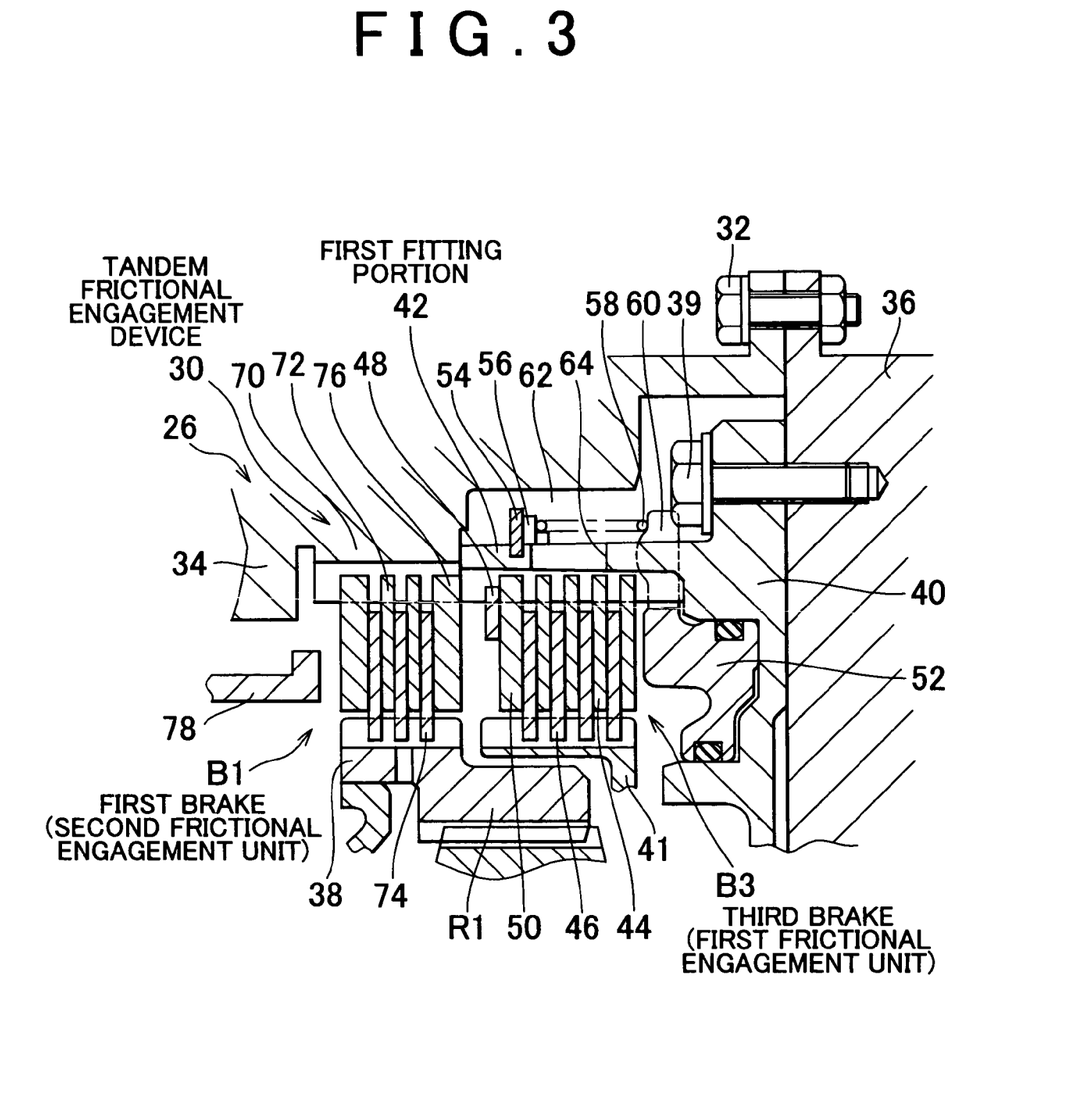
FIG. 3 is a cross-sectional view specifically showing a region corresponding to brakes B1 and B3 of the vehicular automatic transmission shown in FIG. 1.

On the other hand, FIG. 3 is a cross-sectional view specifically showing a tandem frictional engagement device 30 in which the first brake B1 and the third brake B3 are axially disposed adjacent to each other. An upper-half portion of the tandem frictional engagement device 30 located above a center line is illustrated in FIG. 3. The first brake B1 and the third brake B3 are substantially equal in radial dimension and are coaxially disposed in the case 26. The case 26 has a first case member 34 and a second case member 36 that are integrally secured by a bolt 32. The first brake B1 is disposed in the first case member 34, and stops the ring gear R1 and the sun gear S3 from rotating via a coupled portion 38. The third brake B3 is disposed in a brake housing 40 that is integrally secured to the second case member 36 by a bolt 39. The third brake B3 stops the carrier CA1 from rotating via a coupled portion 41. In the present embodiment, the third brake B3 is the first frictional engagement unit while the brake housing 40 and the coupled portion 41 correspond to the first coupling member and the first coupled member respectively, and the first brake B1 is the second frictional engagement unit while the first case member 34 and the coupled portion 38 correspond to the second coupling member and the second coupled member respectively.

The brake housing 40 is integrally provided with a first fitting portion 42 that protrudes in a first direction, namely, in a leftward direction in FIG. 3. A spline is provided on an inner periphery side of the first fitting portion 42, and a plurality of inward friction discs 44 are relatively non-rotatably spline-fitted to the first fitting portion 42. A plurality of outward friction discs 46, which are relatively non-rotatably spline-fitted to an outer periphery side of the coupled portion 41 that is disposed on the inner periphery side of the first fitting portion 42, are alternately interposed among the inward friction discs 44. An annular mounting groove (a straight groove or a tapered groove) is formed in the vicinity of a leading end of the first fitting portion 42. A snap ring 48 as a first stopper member is fitted and attached to the annular mounting groove, so that a clamping plate 50 is so positioned as to be immovable in the first direction. If a first piston 52 is protruded by a hydraulic pressure so that the friction discs 44 and 46 are pressed in the first direction, the friction discs 44 and 46 are frictionally engaged by being clamped between the first piston 52 and the clamping plate 50. Then, the coupled portion 41 is integrally coupled to the case 26, and the carrier CA1 is stopped from rotating. A predetermined dimension is left for the leading end of the first fitting portion 42 such that a sufficient strength is obtained for a load applied to the snap ring 48 during engagement.

Figure 4:
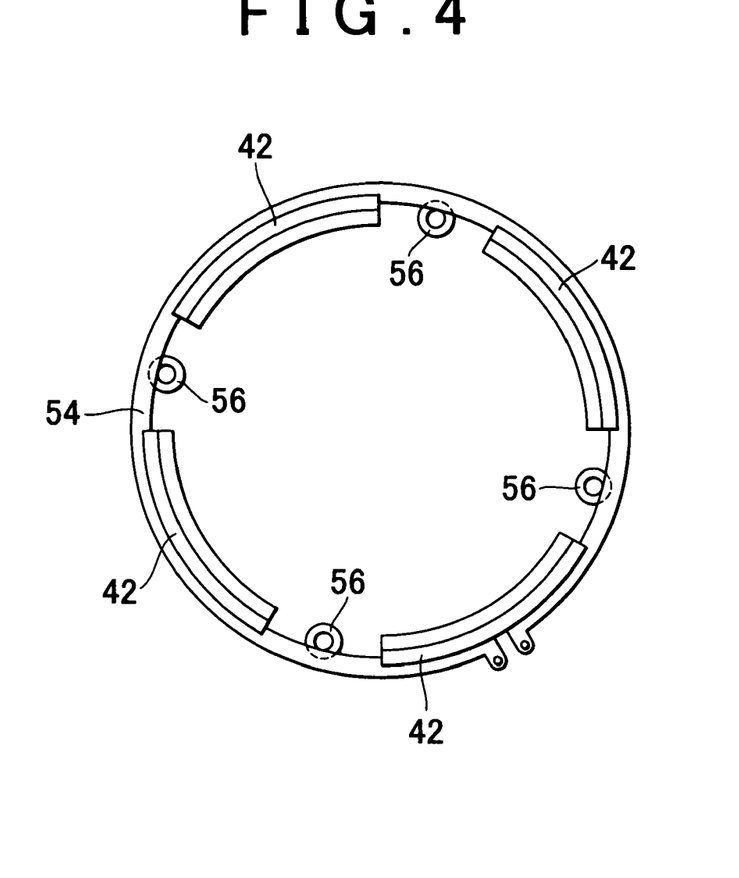
FIG. 4 is a schematic view of a first fitting portion of the brake B3 shown in FIG. 3, which is viewed from the side of a leading end in an axial direction.

As shown in FIG. 4, the first fitting portion 42 is divided into a plurality of sections (four sections in the present embodiment), among which a plurality of spring bearings 56 are disposed via a snap ring 54. A return spring (helical compression spring) 58 is interposed between the spring bearings 56 and the first piston 52. The first piston 52 is integrally provided with a plurality of spring bearing portions 60 in such a manner as to extend from divisional portions of the first fitting portion 42 toward the outer periphery side. The return spring 58 is seated at one end thereof on the spring bearing portions 60.

Figure 5:
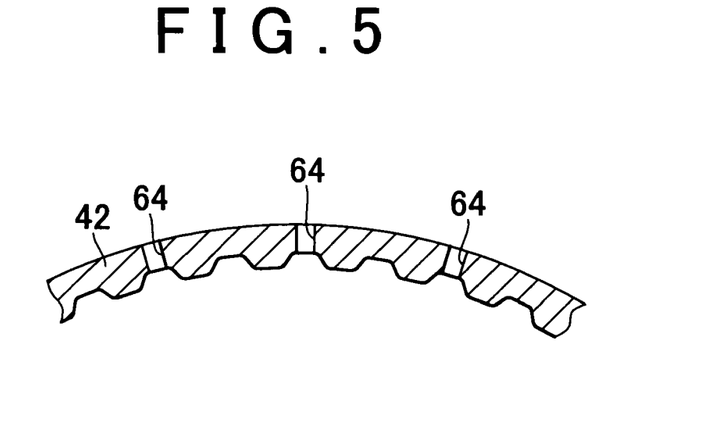
FIG. 5 is a cross-sectional view which shows part of the brake B3 shown in FIG. 3 on an enlarged scale and which is perpendicular to an axial center.

An annular space 62 is formed between the outer periphery side of the first fitting portion 42 and the first case member 34. A plurality of drain ports for causing lubricating oil supplied to lubricate the friction discs 44 and 46 to flow out to the annular space 62 by means of a centrifugal force are formed in bottom portions of the spline of the first fitting portion 42, as is apparent from FIG. 5. The drain ports 64 are intended to restrict a dragging torque from being generated owing to a shearing resistance of the lubricating oil during release of the third brake B3. Although the drain ports 64 may be formed in all the bottom portions, it is also appropriate that the drain ports 64 be formed alternately as shown in FIG. 5. It is also possible that two or more of the bottom portions of the spline be left intact between any adjacent ones of the drain ports 64, for example, if the spline assumes a certain shape.

On the other hand, the first case member 34 in which the first brake B1 is disposed is integrally provided with a second fitting portion 70 in such a manner as to open in a second direction that is opposite to the first direction, namely, in a rightward direction in FIG. 3. A spline is formed on an inner periphery side of the second fitting portion 70, and a plurality of inward friction discs 72 are relatively non-rotatably spline-fitted to the second fitting portion 70. A plurality of outward friction discs 74, which are relatively non-rotatably spline-fitted to an outer periphery side of the coupled portion 38 that is disposed on the inner periphery side of the second fitting portion 70, are alternately interposed among the inward friction discs 72. The leading end of the first fitting portion 42 is located in the vicinity of an opening of the second fitting portion 70, so that a clamping plate 76 is so positioned as to be immovable in the second direction. If the second piston 78 is protruded by a hydraulic pressure so that the friction discs 72 and 74 are pressed in the second direction, the friction discs 72 and 74 are frictionally engaged by being clamped between the second piston 78 and the clamping plate 76. Then, the coupled portion 38 is integrally coupled to the case 26, and the ring gear R1 and the sun gear S3 are stopped from rotating. The first fitting portion 42 functions as a second stopper member for clamping the friction discs 72 and 74 between the first fitting portion 42 and the second piston 78. A protruding dimension of the first fitting portion 42 is determined such that a narrow gap is created between the first fitting portion 42 and the leading end portion of the second fitting portion 70, in consideration of dimensional tolerances (machining errors and the like) of the respective portions.

The third brake B3 is integrally disposed in the second case member 36 using the bolt 39, for example, with the brake housing 40 being mounted with the first piston 52, the friction discs 44 and 46, the return spring 58 and the like. Then, using the bolt 32, the second case member 36 is integrally mounted to the first case member 34 in which the friction discs 72 and 74 of the first brake B1 and the like are disposed in the second fitting portion 70. In this manner, the third brake B3 is disposed adjacent to the first brake B1.

In the tandem frictional engagement device 30 constructed as described above, the leading end of the first fitting portion 42 of the third brake B3 faces the leading end of the second fitting portion 70 of the first brake B1 with a narrow gap formed therebetween, and the first fitting portion 42 functions as the second stopper member for clamping the friction discs 72 and 74 between the first fitting portion 42 and the second piston 78. Therefore, there is no need to provide the second stopper member as a separate piece, and the overall axial dimension can be reduced substantially by an axial dimension of a snap ring, for example, in comparison with a case where a pair of snap rings are fitted as shown in FIG. 6(c).

Further, since it is improbable that the first fitting portion 42 will be deformed during engagement of the first brake B1, it is easy to manage a piston stroke of the first brake B1, and the control of engagement torque can be performed finely with high precision. Since the third brake B3 is not influenced at all, suitable clearances are maintained among the friction discs 44 and 46, so that the occurrence of dragging is restricted.

The third brake B3 can be constructed as a single frictional engagement unit substantially in the same manner as in the related art, without taking the first brake B1 into account. In the present embodiment, since the snap ring 48 as the first stopper member is fitted in the predetermined mounting groove, the control of engagement torque can be performed finely with high precision by a stroke of the pistons, and the clearances of the friction discs 72 and 74 of the first brake B1 are not influenced during engagement of the third brake B3.

The brake housing 40 in which the friction discs 44 and 46 of the third brake B3 and the like are disposed is constructed separately from the case 26 in which the first brake B1 is disposed. For example, therefore, after mounting the third brake B3 to the brake housing 40 and securing the brake housing 40 to the second case member 36, the second case member 36 is integrally mounted to the first case member 34 in which the first brake B1 is disposed. Thus, the degree of freedom in mounting operation is enhanced, and the manufacturing cost is reduced.

Further, according to the tandem frictional engagement device 30 of the present embodiment, in the case where the first brake B1 and the third brake B3 are axially disposed adjacent to each other, the brake housing 40 for the third brake B3 having the first fitting portion 42 that is used as the second stopper member is integrally secured to the case 26 in which the first brake B1 is disposed. Therefore, the first fitting portion 42 functions suitably as the second stopper member.

Further, according to the present embodiment, the annular space 62 is formed between the first fitting portion 42 and the first case member 34, and the drain ports 64 for causing lubricating oil for the friction discs 44 and 46 to flow out to the annular space 62 by means of a centrifugal force are formed in the first fitting portion 42. Therefore, when the carrier CA1 is in rotation while the third brake B3 is released, the occurrence of a phenomenon wherein the lubricating oil rotates together with the carrier CA1 and stays inside the first fitting portion 42 due to a centrifugal force and wherein shearing resistance of the lubricating oil causes an increase in dragging resistance and a deterioration in transmission efficiency is restricted.

The tandem frictional engagement device of the invention is appropriately applied to a vehicular power transmission system such as an automatic transmission of planetary gear type, a forward-backward switching unit, or the like, namely, to a system that is designed to change over a plurality of gear-shift stages or to switch forward and backward movements of a vehicle in accordance with operational states of clutches and brakes as frictional engagement units. However, the tandem frictional engagement device of the invention is also applicable to a non-vehicular power transmission system.

The first coupling member of the first frictional engagement unit and the second coupling member of the second frictional engagement unit are integrally secured and not rotatable as in the case of the second invention. However, it is also appropriate that the frictional engagement units be designed as clutches and that the first coupling member and the second coupling member be disposed rotatably. Since the first fitting portion of the first coupling member is used as the second stopper member of the second frictional engagement unit, it is desirable that the first and second coupling members be integrally secured to each other. However, since the second stopper member has only to clamp a friction disc while preventing it from being axially displaced, it is also possible that the first and second coupling members be caused to rotate relative to each other. For instance, it is appropriate that the second coupling member be constructed as a non-rotatable case and that the first coupling member be constructed as a rotational member.

The first and second coupling members are disposed, for example, on the outer periphery side of the first and second coupled members respectively. However, the first and second coupled members may be disposed on the outer periphery side of the first and second coupling members respectively. It is also appropriate that the first coupled member be disposed on the inner periphery side of the first coupling member and that the second coupled member be disposed on the outer periphery side of the second coupling member. After all, the first and second coupling members and the first and second coupled members may be disposed in various manners.

A friction disc, which is relatively non-rotatably spline-fitted to each of the first and second coupled members, is frictionally engaged with a friction disc on the side of a corresponding one of the first and second coupling members. The first and second coupling members are thereby coupled to the first and second coupled members respectively while being integrated with each other or maintaining a predetermined slip state. Although one friction disc may be provided in each of the aforementioned members, it is also appropriate that two or more friction discs be disposed axially alternately in each of the aforementioned members.

It is desirable that the first and second frictional engagement units be mounted individually with the friction discs, be constructed separately, be disposed adjacent to each other, and then be combined with each other. However, the procedure of assembling the first and second frictional engagement units is not limited but can be carried out in various manners.

Various members including a snap ring can be used as the first stopper member of the first frictional engagement unit. For example, however, the second fitting portion of the second frictional engagement unit may be designed to function as the first stopper member. The second fitting portion may also be designed to prevent displacement of the friction disc of the first frictional engagement unit via a cylindrical spacer or the like. Also in the case where the first fitting member is used as the second stopper member, the friction disc of the second frictional engagement unit may directly abut on the leading end of the first fitting portion. In this case, however, they may indirectly abut on each other via a cylindrical spacer or the like.

While the invention has been described with reference to the preferred embodiment thereof, it is to be understood that the invention is not limited to the preferred embodiment or constructions. To the contrary, the invention is intended to cover various modifications and equivalent arrangements. In addition, while the various elements of the preferred embodiment are shown in various combinations and configurations, which are exemplary, other combinations and configurations, including more, less or only a single element, are also within the spirit and scope of the invention.

What is claimed is:

1. A tandem frictional engagement device comprising:
   a first frictional engagement unit that couples a first coupling member to a first coupled member through a procedure wherein a friction disc that is relatively non-rotatably spline-fitted to the first coupling member is pressed by a first piston in a first direction and wherein the friction disc and another friction disc on the side of the first coupled member are clamped between the first piston and a first stopper member; and
   a second frictional engagement unit that couples a second coupling member to a second coupled member through a procedure wherein a friction disc that is relatively non-rotatably spline-fitted to the second coupling member is pressed by a second piston in a direction opposite to the first direction and wherein the friction disc and another friction disc on the side of the second coupled member are clamped between the second piston and a second stopper member,
   wherein
   the first coupling member and the second coupling member are constructed separately from each other,
   a splined leading end of a first fitting portion of the first coupling member to which the friction disc is spline-fitted is so disposed as to substantially abut on a second fitting portion of the second coupling member to which the friction disc is spline-fitted, and
   the leading end of the first coupling member is used as the second stopper member.

2. The tandem frictional engagement device according to claim 1, wherein
   the leading end of the first fitting portion of the first coupling member substantially abuts on the second fitting portion of the second coupling member in an axial direction of the first and second coupling members.

3. The tandem frictional engagement device according to claim 2, wherein
the leading end of the first fitting portion of the first coupling member prevents the friction disc spline-fitted to the second fitting portion of the second coupling member from being displaced in the axial direction.

4. The tandem frictional engagement device according to claim 3, wherein
a spacer is interposed between the friction disc spline-fitted to the second fitting portion and the leading end of the first fitting portion.

5. The tandem frictional engagement device according to claim 1, wherein
the first stopper member is a snap ring.

6. The tandem frictional engagement device according to claim 1, wherein
the leading end of the first fitting portion of the first coupling member is higher in axial rigidity than the first stopper member.

7. The tandem frictional engagement device according to claim 1, wherein
the second coupling member is a non-rotatable case, and
the first coupling member is integrally secured, at a location other than the first fitting portion to the case while the leading end of the first fitting portion substantially abuts on the second fitting portion.

8. The tandem frictional engagement device according to claim 1, wherein
an annular space is formed on an outer periphery side of the first fitting portion and between the first fitting portion and the case, and
the first fitting portion is provided with a drain port that causes lubricating oil for the friction disc spline-fitted on an inner periphery side to flow out to the annular space by means of a centrifugal force.

9. An automatic transmission that is mounted with the tandem frictional engagement device according to claim 1.

* * * * *